United States Patent
Antoine et al.

(10) Patent No.: US 7,313,209 B2
(45) Date of Patent: Dec. 25, 2007

(54) METHOD AND ARRANGEMENT TO SYNCHRONIZE A MULTI-CARRIER TRANSMISSION SYSTEM

(75) Inventors: Philippe Antoine, Walhain (BE); Wim André Paula De Wilde, Heverlee (BE)

(73) Assignee: Alcatel, Paris (FR)

( * ) Notice: Subject to any disclaimer, the term of this patent is extended or adjusted under 35 U.S.C. 154(b) by 942 days.

(21) Appl. No.: 10/355,081

(22) Filed: Jan. 31, 2003

(65) Prior Publication Data
US 2003/0152157 A1    Aug. 14, 2003

(30) Foreign Application Priority Data
Feb. 12, 2002    (EP) .................................. 02290342

(51) Int. Cl.
*H04L 7/00*    (2006.01)
(52) U.S. Cl. ..................... 375/354; 375/147; 370/509
(58) Field of Classification Search ............... 375/259, 375/260, 354, 147; 370/503, 509
See application file for complete search history.

(56) References Cited

FOREIGN PATENT DOCUMENTS

| EP | 0 785 645 A1 | 7/1997 |
|---|---|---|
| EP | 0 903 897 A1 | 3/1999 |
| EP | 0 903 897 B1 | 10/2001 |
| FR | 2 790 344 A1 | 9/2000 |

*Primary Examiner*—Dac V. Ha
(74) *Attorney, Agent, or Firm*—Sughrue Mion, Pllc.

(57) ABSTRACT

The invention relates to a method to synchronise a multi-carrier transmission system wherein a time misalignment between a transmitter and a receiver is determined through an average of at least two pilot tones phase errors ($Ø_i$) weighted in accordance with the noise affecting each pilot tone transmission. Such method is characterised in that, when the noise affecting a pilot tone (38, 40) reaches a predetermined level, the pilot tone function is reallocated from this pilot tone (38, 40) to another carrier (42, 44) and/or this pilot tone weight is reduced.

16 Claims, 3 Drawing Sheets

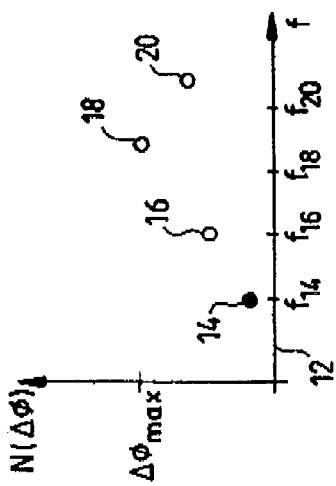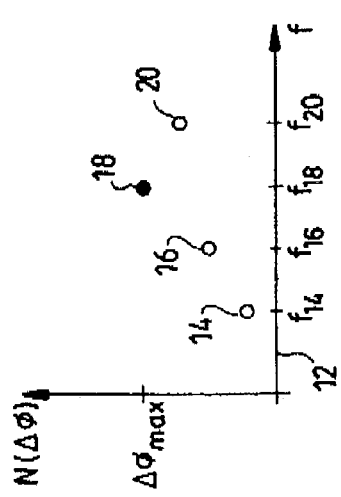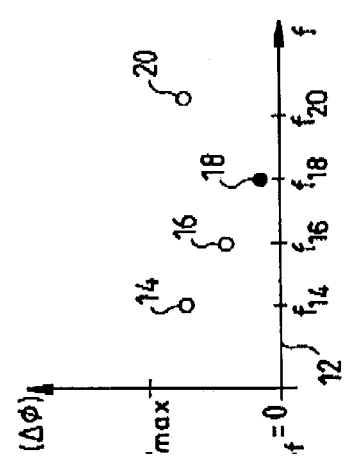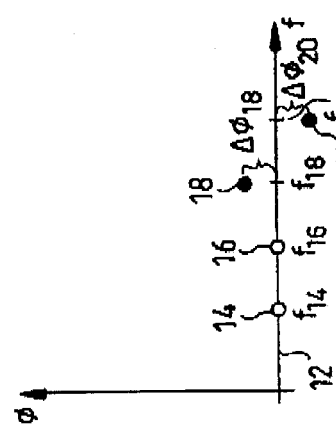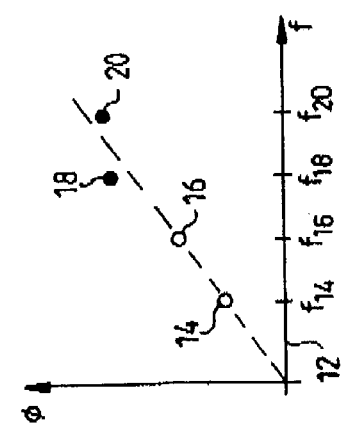

Figure 5:
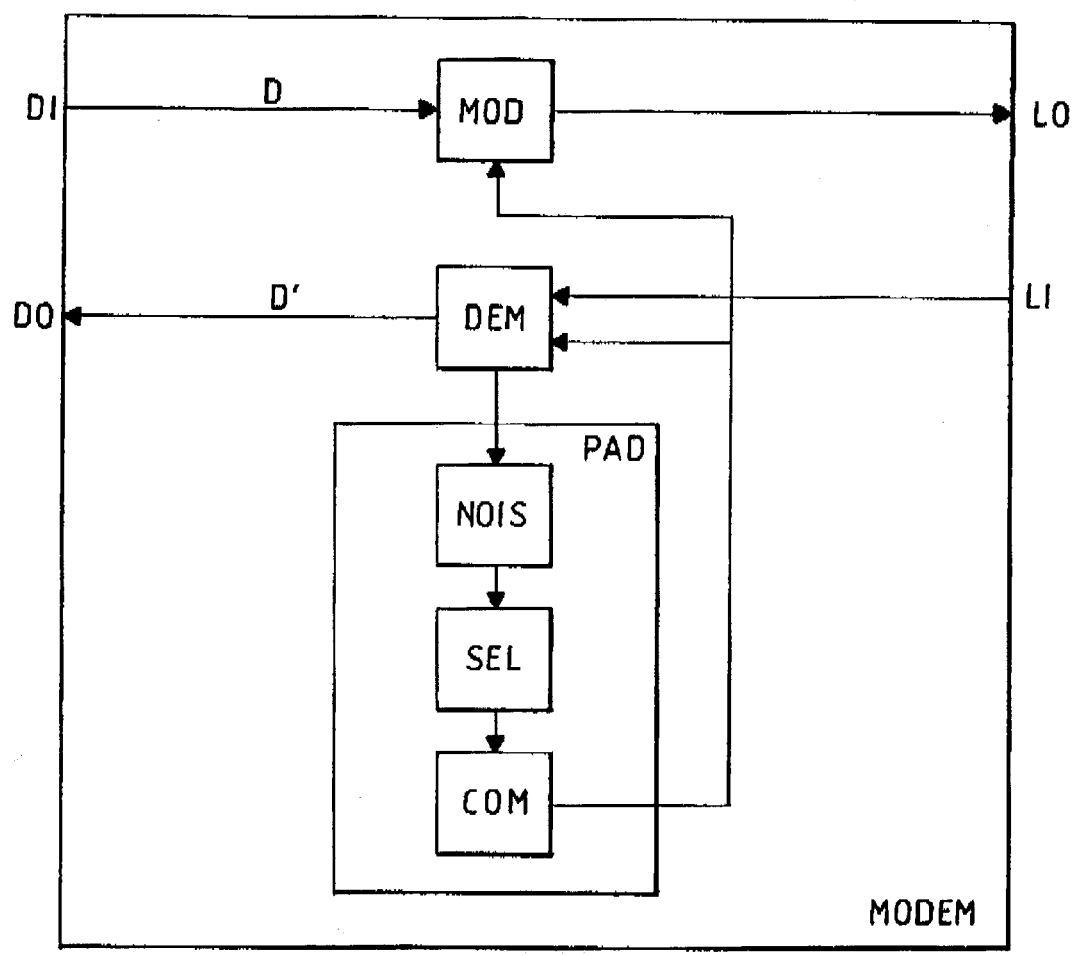

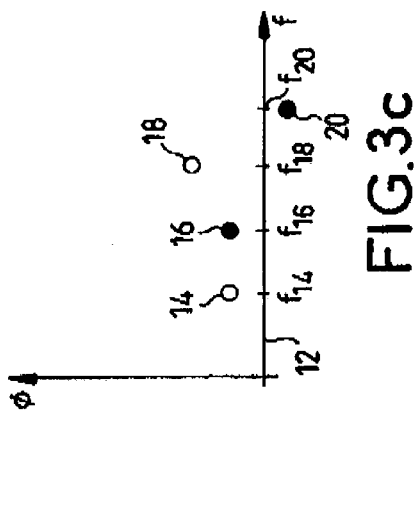
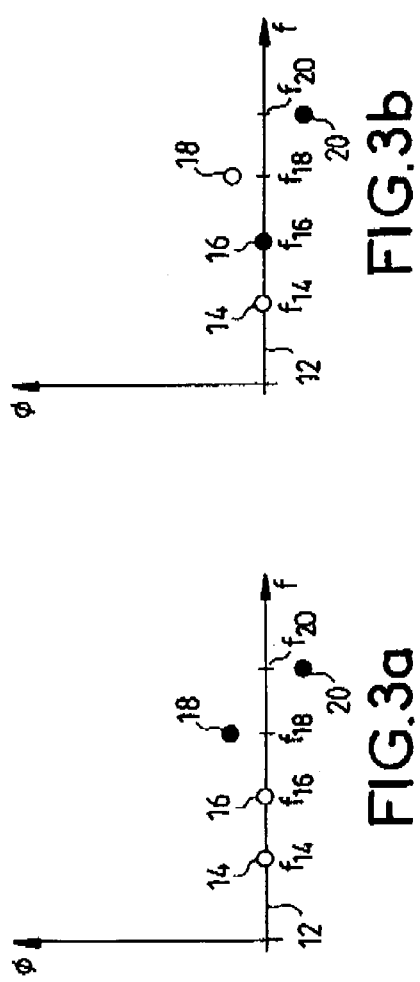
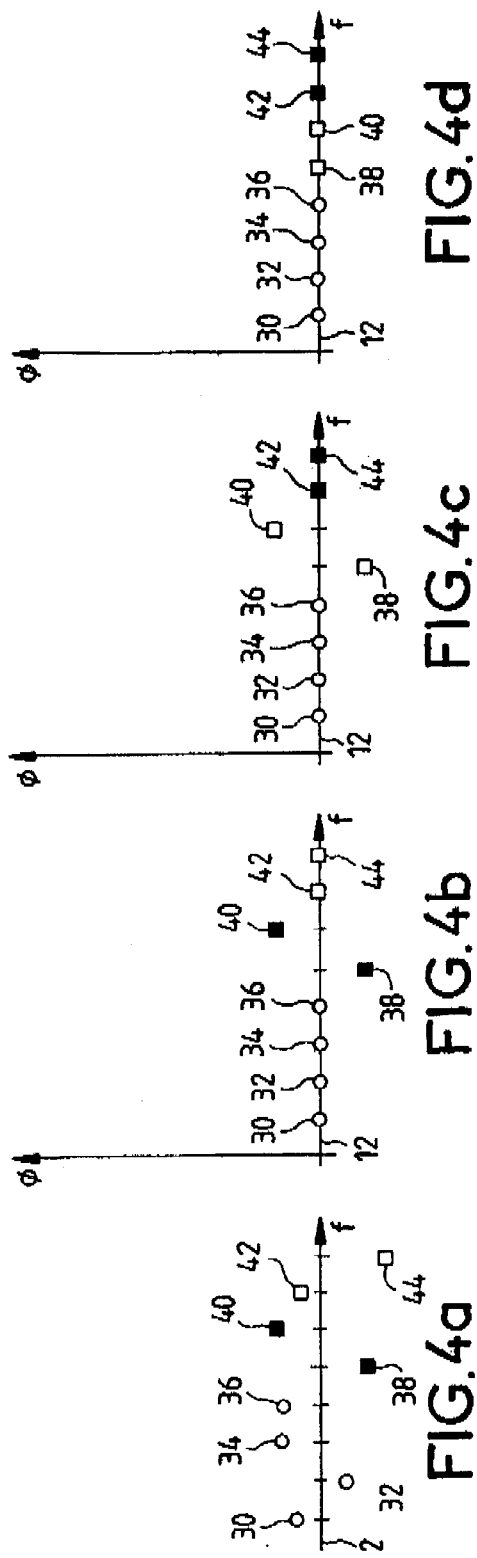

METHOD AND ARRANGEMENT TO SYNCHRONIZE A MULTI-CARRIER TRANSMISSION SYSTEM

The present invention relates to a method and an arrangement to synchronize a multi-carrier transmission system.

A multi-carrier transmission system uses a plurality of carriers to send data from a transmitter to a receiver. For instance, 256 modulated carriers with equidistant frequencies transmit data in a system operating according to the Asymmetric Digital Subscriber Line (ADSL) technology.

In such an ADSL system, data is transmitted by packets or cells called Discrete Multi Tone (DMT) symbols. Each DMT symbol is coded by the superposition of the 256 carriers during a predetermined length in time. In other words, a continuous flow of consecutive DMT symbols is transmitted by the carriers from the transmitter to the receiver.

To treat the transmitted data, the receiver must detect each block of data which corresponds to each DMT symbol. This detection operates with clocks equipping the transmitter and the receiver. More precisely, the transmitter clock determines the length in time allocated to each DMT symbol while the receiver clock measures such predetermined length in time so that the data received during this period can be attributed to a DMT symbol.

Therefore, data transmission requires an exact synchronization between the transmitter's clock and the receiver's clock. Otherwise, if the transmitter clock and the receiver clock are not synchronized, the blocks of data treated by the receiver do not correspond to the transmitted DMT symbols, the receiver being in consequence unable to decode the transmitted data.

To guarantee the synchronization between the transmitter and the receiver clock, it is known to use one of the transmitted carriers, hereinafter called pilot tone, for synchronization purposes. For instance, ADSL systems commonly use a frequency of 276 kHz for coding data tuning the transmitter and the receiver clocks.

Disappointingly, the presence of noise in the vicinity of the pilot tone frequency leads to a reduction of the pilot tone quality, i.e. to a probable loss of synchronization between the transmitter and the receiver. In this case, the system fails to transmit information or is degraded in performance.

The patent EP 0785645 discloses a method to synchronize a transmitter and a receiver which operate correctly even when noise and/or disturbances appear in the vicinity of the pilot tone frequency. According to this method, the pilot tone is adaptively selected among the carriers transmitted between two stations in function of the noise affecting such carriers.

More precisely, the noise affecting each carrier is determined at the initialisation of the transmission system through a predetermined noise criterion to be fulfilled, the pilot tone function being allocated to a carrier fulfilling this criterion. Thereafter, during normal operation of the system, noise is determined repetitively on each carrier so that another pilot tone is selected within the transmitted carriers whenever the predetermined noise criterion is no longer fulfilled by the carrier operating as a pilot tone.

Thus, whenever the transmission quality of a pilot tone becomes poor, the pilot tone function is allocated to a less noisy carrier. In this way, by selecting adaptively the carrier operating the pilot tone function, the synchronization of the system is adapted to the disturbances affecting the frequencies.

FIGS. 1a, 1b and 1c represent schematically an example of pilot tone function reallocation according to the previously described method of adaptive allocation. In this example, the multi-carrier system is limited to four carriers 14, 16, 18 and 20 of respective frequencies $f_{14}$, $f_{16}$ $f_{18}$ and $f_{20}$. These carriers are represented in FIG. 1a according to their modulating frequency f (axis 12) and the noise N affecting their transmission.

The noise $N_i$ modifies the phase error $\emptyset_i$, i.e. the difference of phase or distance between the received phase $\emptyset_i$ and an expected phase $\emptyset_{ref}$ for each carrier. To evaluate the noise $N_i$ affecting each carrier i, the phase error distribution $\Delta\emptyset_n$ generated by such noise $N_i$ i is determined.

At the initialisation of the system, data is transmitted by the carriers 14, 16 and 20 of frequencies $f_{14}$, $f_{16}$ and $f_{20}$ whereas the carrier 18 of frequency $f_{18}$ is only used to synchronize the transmitter and the receiver. For clarity, it is therefrom considered in this example that pilot tones do not carry data.

Carrier 18 has been selected as pilot tone since it fulfils, at the initialisation of the system represented in FIG. 1a, a predetermined quality transmission requirement. In this example, such requirement is the highest signal to noise ratio by squared frequency product.

At one point represented in FIG. 1b, the noise affecting the transmission of the carrier 18 has increased, the phase error dispersion $\Delta\emptyset_{18}$ having reached a maximum $\Delta\emptyset_{max}$ admissible by the system. Therefore, according to the invention, the pilot tone function changes from the carrier 18 to a less disturbed carrier 14, allowing thereby a better synchronization between the transmitter and the receiver.

The patent EP 0903897 discloses another method to improve the synchronization between a transmitter clock and a receiver clock in a multi-carrier system. According to this method, a time misalignment between a transmitter and a receiver, in a multi-carrier system, is corrected by determining a phase error average based on a plurality of pilot tones phases errors.

It is important to underline that a time misalignment, or clock timing error, affects all the carriers' phases. Indeed, if the receiver clock is misaligned relatively to the transmitter clock, a phase error proportional to the frequency is generated for all the carriers transmitted.

Briefly, this method comprises the steps of detecting the phase error $\emptyset_i$ affecting each pilot tone, calculating a weight $A_i$ depending on the value of a transmission quality parameter measured for each pilot tone and evaluating a system clock error based on an average of the measured phase errors $\emptyset_i$ and their weights $A_i$.

The weight $A_i$ of each pilot i depends on the perturbation affecting the carrier considered. Thus, a first pilot carrier transferred with a low transmission quality has a relatively low weight in the clock timing error determination whereas the phase error detected for a second pilot carrier transferred with a high transmission quality has a relatively high weight in the clock timing error.

FIGS. 2a and 2b illustrate schematically an operation according to this method. The system considered is similar to the previously described system, i.e. a multi-carrier transmission system using four carriers 14, 16, 18 and 20 modulated by respective frequencies $f_{14}$, $f_{16}$, $f_{18}$ and $f_{20}$.

In FIG. 2a, an estimation of the receiver clock misalignment affecting the transmission system is performed using the phase errors $\emptyset_{18}$ and $\emptyset_{20}$ of the carriers 18 and 20, of frequencies $f_{18}$ and $f_{20}$, operating as pilot tones.

In other words, the phase errors $\emptyset_{18}$ and $\emptyset_{20}$ affecting respectively these pilot tones 18 and 20 are taken into account to evaluate a clock timing error by associating to each of these error phases a weight $A_{18}$ and $A_{20}$, equal to ½ in this case. Thus, the phase error of the system due to a time misalignment appears to be:

$\emptyset_{sys}=(\emptyset_{18/f18}+\emptyset_{20/f20})/2$. As shown, a time misalignment results in a linear phase dependence.

The FIG. 2b represents the carriers 14, 16, 18 and 20 phase errors $\emptyset_{14}$, $\emptyset_{16}$, $\emptyset_{18}$ and $\emptyset_{20}$ after the receiver clock misalignment has been corrected according to such system phase error $\emptyset_{sys}$. As a consequence, all the carriers phase are modified according to such new time alignment.

The synchronization method described in the patent EP 0903897, using a group of pilot tones, might be perturbed when the group of pilot tones is transmitted under noisy conditions. The present invention solves this problem. It is based on the recognition that each pilot tone of the group might be disturbed differently by noise depending on its frequency. Such situation is represented in FIGS. 2a and 2b wherein carriers 18 and 20 are affected by proper respective phase errors due to proper noise $\Delta\emptyset_{18}$ and $\Delta\emptyset_{20}$.

Thus, the invention relates to a multi-carrier communication system correcting clock timing misalignment as described in patent EP 0903897 while considering individually the noise affecting each pilot tone to optimize the system synchronization. For instance, such optimization may be a reallocation of the pilot tone function as described in patent EP 0785645.

More generally, the invention concerns a method to synchronise a multi-carrier transmission system wherein a time misalignment ($\Delta t$) between a transmitter and a receiver is determined through an average of at least two pilot tones phase errors ($\emptyset_i$) weighted ($A_i$) in accordance with the noise ($N_i$) affecting the pilot tones transmission, characterised in that, when the noise ($N_i$) affecting a pilot tone reaches a predetermined level, the pilot tone function of this pilot tone is reallocated to another carrier and/or this pilot tone weight ($A_i$) is modified.

The above mentioned and other objects or features of the invention will become more apparent and the invention itself will be best understood by referring to the following description of an embodiment taken in conjunction with the accompanying drawing wherein:

FIGS. 1a, 1b and 1c, already described, represents the operation of a method to allocate a pilot tone according to patent EP 0785645, FIGS. 2a and 2b, already described, represents the operation of a method to synchronize a multi-carrier system according to patent EP 0903897, FIGS. 3a, 3b and 3c represent a combined application of the synchronization methods disclosed in patents EP 0785645 and EP 0903897 according to the invention, FIGS. 4a, 4b, 4c and 4d represent the operation of a synchronization method according to the invention, and FIG. 5 represent a scheme of a multi-carrier modem implementing the invention.

According to the invention, a first embodiment relates to a pilot tone weight ($A_i$) reduction in a multi-carrier transmission system correcting a time misalignment between a transmitter and a receiver through an average of a plurality of pilot tones phase errors weighted in accordance with the noise affecting such pilot tones. More precisely, when the noise ($N_i$) affecting such pilot tone reaches a predetermined level, the weight ($A_i$) of such pilot tone is reduced. Such reduction might be a complete reset of the pilot tone weight.

Thereby, this first embodiment allows to reduce the influence of a noisy pilot tone in the time misalignment determination without requiring a modification of the number of bits allocated to each carrier. In other words, this embodiment does not require any bit swap procedure.

At the opposite, such bit swap procedure might be required in a method to synchronise a multi-carrier transmission system, correcting a time misalignment through an average of pilot tones phase errors, wherein the pilot tone function is reallocated from a pilot tone to another carrier when the noise affecting such pilot tone reaches a predetermined level. Indeed, if the pilot tone function is allocated to another carrier transmitting more bits than a pilot tone could transmit (typically more than two) the excess of bits must be reallocated to other carrier(s).

Moreover such reallocation might generate artificial timing correction as explained hereinafter with FIGS. 3a, 3b and 3c wherein a multi-carrier system comprising four carriers 14, 16, 18 and 20 is considered, two carriers 14 and 16, of respective frequencies $f_{14}$ and $f_{16}$, carrying data and two carriers 18 and 20, of respective frequencies $f_{18}$ and $f_{20}$, being used exclusively as pilot tones.

As represented in FIG. 3a, a clock timing error between the transmitter clock and the receiver clock is corrected based on the phases $\emptyset_{18}$ and $\emptyset_{20}$ of the pilot tones 18 and 20. Such carriers 18 and 20 were initially equalized so that their respective initial phase error equaled zero.

According to an embodiment of the invention, in case noise strongly affects pilot tone 18, the pilot tone function is allocated to another carrier, for instance carrier 16. The result of such reallocation is shown in FIG. 3b. In this case, a misalignment error is artificially generated if the average of the phase errors affecting carriers 16 and 20 differs from the one affecting carriers 18 and 20. This might appear, for instance, when the phase errors of carrier 16 and carrier 20 are not equal to zero due to a frequency dependent time variation of the channel response. Therefrom, a correction of the clock timing synchronization is operated only because of this pilot tone reallocation. Such correction might perturb the synchronization of the system.

To avoid this situation, in this second embodiment, the pilot tone function reallocation and/or the weight reduction is operated when the average of the pilot tones phase errors before the reallocation and/or the weight reduction is practically equal to the average of the pilot tones phase errors after such reallocation and/or weight reduction. Thus, the pilot tone reallocation and/or the weight reduction do/does not provoke a time synchronisation.

Such a requirement may be achieved by considering two group of pilot tones, as described thereafter with FIGS. 4a, 4b, 4c and 4d relating to a multi-carrier system wherein height carriers 30, 32, 34, 36, 38, 40, 42 and 44 are represented in function of their respective frequency $f_{30}$, $f_{32}, f_{34}, f_{36}, f_{38}, f_{40}, f_{42}$ and $f_{44}$ and their respective phase error $\emptyset_{30}$, $\emptyset_{32}$, $\emptyset_{34}$, $\emptyset_{36}$, $\emptyset_{38}$, $\emptyset_{40}$, $\emptyset_{42}$, and $\emptyset_{44}$.

Two groups of pilot tones are considered:

A first group of active pilot tones 38 and 40, which are used to evaluate the time phase error of the system according to the method disclosed in the patent EP 0,903,897, A second group of inactive pilot tones 42 and 44, which are not considered to determine the phase error of the system.

Once the system phase error has been determined, the carriers 30, 32, 34 and 36 and the inactive pilot tones 42 and 44 are equalized as represented in FIG. 4b. Such equalization can be performed since inactive pilot tones are not considered to determine the system phase error.

Thereafter, the active pilot tones 38 and 40 are inactivated while the inactive pilot tones 42 and 44 are activated. Such operation is represented in FIG. 4c. The time misalignment of the receiver clock is evaluated therefrom with the phase errors $\varnothing_{42}$ and $\varnothing_{44}$ affecting the new active pilot tones 42 and 44. The inactive pilot tones 38 and 40 are thereafter equalized. The result of this operation is represented in FIG. 4d.

It might be underlined that the previously described method is based on the fact that a time misalignment correction must not be operated in parallel with a pilot equalization. The present invention is clearly not restricted to a method using two sets of pilots but it applies to any adaptive method that achieves the pilot equalization without interfering with the time misalignment algorithm. For example, equalization of the pilot tones could be obtained through a method which splits the phase error of the pilots into a linear frequency dependent term, corresponding to the average time misalignment, and a proper deviation fed into an adaptive equalization algorithm.

An arrangement implementing the invention, which operates by using an active and an inactive group of pilot tones and/or by reducing the weights allocated to each pilot tone phase error, is described with FIG. 5. This FIG. 5 represents a block scheme of a multi-carrier modem MODEM provided with a pilot carriers allocation device PAD, a modulator MOD and a demodulator DEM. The pilot carriers allocation device PAD is equipped with a noise determining unit NOIS, a selection unit SEL and a communication unit COM.

The modulator MOD is coupled between a data input DI, via which data D are applied to the modulator MOD, and a line output LO of the modem. The demodulator DEM on the other hand, is coupled between a line input LI of the modem and a data output DO whereto demodulated data D' are applied. Another output of the demodulator DEM is coupled to an input of the pilot carrier allocation device PAD and more particularly to the noise determining unit NOIS thereof. In the pilot carriers allocation device PAD, the noise determining unit NOIS, selection unit SEL and communication unit COM are series connected. An output of the communication unit COM is connected to an additional input of the modulator MOD, another output being connected to the demodulator DEM to operate timing recovery feedback and equalization feedback as described thereafter.

The modulator MOD and demodulator DEM do not differ in working from known, multi-carrier modems. They are of the Discrete Multi Tone (DMT) type. Such DMT modulator and demodulator are for instance used in the Asynchronous Digital Subscriber Line (ADSL) equipment which operates in accordance with the specifications of the ANSI Standard on ADSL, entitled 'Asymmetric Digital Subscriber Line (ADSL) Metallic Interface Specification', published by the American National Standards Institute, Inc. (ANSI) in April 1994. The approved version of this ANSI Standard on ADSL is referred to by ANSI T1.413 and is entitled 'Network and Customer Installation Interfaces, Asymmetric Digital Subscriber Line (ADSL) Metallic Interface. Therein, the line input LI and line output LO of each modem is coupled to a twisted pair telephone line. The modulator MOD modulates data bits D received via its data input DI on a set of carriers whose frequencies constitute a set of equidistant frequencies. The data bits D simultaneously transmitted on the different carriers in the set constitute Discrete Multi Tone (DMT) symbols.

To perform the modulation, the modulator MOD is provided with a mapper which maps the correct number of data bits on each carrier, an inverse fast Fourier transform processor which converts the modulated carriers from frequency domain to time domain, and a guard adder which adds to each one of the DMT symbols a cyclic prefix to compensate for intersymbol interference caused by transmission of the DMT symbols over the twisted pair telephone line. Via a digital to analog converter, the DMT symbols are made suitable for transmission over the line.

The demodulator demodulates the data from the set of carriers and applies the demodulated data D' to the data output DO of the modem. The demodulator DEM thereto is composed of an analog to digital converter, a time domain equalizer, a cyclic prefix subtractor, a fast Fourier transform processing unit, a frequency domain equalizer and a demapper.

The time domain equalizer is a digital filter which shortens the impulse response of the channel, allowing thereby the cyclic prefix added to each one of the DMT symbols to have an acceptable length. The cyclic prefix subtractor removes the cyclic prefix from the received DMT symbols and the fast Fourier transform processing unit converts the received symbols from time domain representation to frequency domain representation. In addition, the amplitude and phase distortion of the telephone line over which the symbols were transmitted, become compensated by a second digital filter which is implemented in the frequency domain equalizer, and the demapper performs the task of extracting the correct amount of bits of each one of the carriers. For purposes of synchronization or sample clock adjustment between transmitting and receiving station, the demodulator DEM further includes a digital phase locked loop. The input of the digital phase locked loop is extracted from the phase error that affects the pilot tones.

The contents of the Discrete Multi Tone modulator MOD and demodulator DEM will not be described in further detail which, with respect to ADSL (Asymmetric Digital Subscriber Line) requirements, are described in the already mentioned ANSI Standard on ADSL whilst specific implementations of Discrete Multi Tone modulators and demodulators are found in the articles 'A multi-carrier E1-HDSL Transceiver System with Coded Modulation', written by Peter S. Chow, Naofal Al-Dhahir, John M. Cioffi and John A. C. Bingham and published in the issue Nr. 3, May/June 1993 of the Journal of European Transactions on Telecommunications and Related Technologies (ETT), pages 257-266, and 'Performance Evaluation of a Multichannel Transceiver System for ADSL and VHDSL Services' from Peter S. Chow et al., published in the issue Nr. 6, August 1991 of the Journal of European Transactions on Telecommunications and Related Technologies (ETT), pages 909-919.

At initialisation of such a new installed station, noise on each one of the carriers is determined. In this embodiment, 8 frequencies (cf FIGS. 4a, 4b, 4c and 4d) are considered, four of them being used to transmit data while four of them are used as pilot carriers. According to the invention, two pilot tones are active while two pilot tones are inactive.

The new installed station thereto sends a predetermined pattern to the central office. Via the demodulator DEM in the central office, the received pattern is applied to the noise determining unit NOIS which compares the received pattern to the pattern which was expected to be received. From this comparison, the noise determining unit NOIS calculates the signal to noise ratio on each carrier in the set of carriers. The results of its calculations are applied to the selection unit SEL which assigns four of the carriers to be used as pilot carriers.

Consequently, the selection unit SEL selects those four carriers whose signal to noise ratio by squared frequency product exceeds a predetermined threshold value. Thereafter, the selection unit SEL selects the groups of carriers which compose the group of active carriers and the group of inactive carriers.

During normal working, the active pilot tones are inactivated while the inactive pilot tones, continuously equalized when inactivated, are activated on regular basis. Moreover the noise determining unit NOIS repetitively determines the signal to noise ratio on all carriers in a way similar as for the initialisation phase. If the quality of a pilot carrier transmission is reduced to a certain extent, such quality transmission level being characterized through the signal to noise ratio by the squared frequency product, the selection means SEL reallocates the pilot tone function to other carrier(s) and/or lowers the pilot weight in the time misalignment determination.

It is remarked that the exchange between active and inactive groups of pilot tones could be performed on regular basis. Also, noise evaluation has not to be based necessarily on signal to noise ratio measurements as described in the above specific embodiment. It is clear to a person skilled in the art that any measurement giving an indication of the noise on each of the carriers can be used to reallocate the pilot carrier and/or to modify the pilot weights.

In an alternative embodiment, for instance, the average phase angle difference measured between the vectors representing the received carriers and the carriers expected to be received may be used to gain information about the noise on the different carriers. The noise is not proportional to the phase error but rather to the dispersion around the average received point. The selection unit SEL of such an alternative embodiment selects pilot carriers with a phase angle difference below a predetermined threshold.

The activation of a group of pilot tones can also be based on the before hand knowledge that certain carriers are likely to be disturbed at a certain time, e.g. because of existing radio transmitters in the given frequency band emitting at this time.

The invention can be implemented in any multi-carrier telecommunication system wherein one or more frequencies are reserved for synchronization purposes. The implementation of the described method is clearly not restricted to Discrete Multi Tone modems or to the field of ADSL.

The invention claimed is:

1. A method to synchronize a multi-carrier communication system comprising a plurality of carriers wherein at least one carrier has a pilot tone function, the method comprising:
   determining a time misalignment between a transmitter and a receiver based on an average of phase errors of at least two pilot tones, wherein a phase error of a pilot tone is weighted by a pilot tone weight based on noise affecting the pilot tone; and
   if the noise is greater than or equal to a predetermined level, performing at least one of reallocating the pilot tone function from the at least one carrier to another carrier of the plurality of carriers and reducing the pilot tone weight.

2. The method according to claim 1, wherein the at least one of the reallocating the pilot tone function and the reducing the pilot tone weight is performed if an average of the phase errors of the at least two pilot tones before performing the at least one of the reallocating the pilot tone function and the reducing the pilot tone weight is substantially equal to an average of the phase errors of the at least two pilot tones after performing the at least one of the pilot tone function reallocation and the weight reduction.

3. The method according to claim 2, wherein the at least two pilot tones are equalized before performing the at least one of the pilot tone function reallocation and the weight reduction.

4. The method according to claim 3, wherein before the at least two pilot tones are equalized,
   a first operation is performed in which active pilot tones comprising the at least two pilot tones are used to synchronize the multi-carrier communication system, then a second operation is performed wherein
   a second operation is performed in which inactive pilot tones comprising pilot tones other than the at least two pilot tones are activated and used to synchronize the multi-carrier communication system, and then the active pilot tones are inactivated and equalized.

5. The method according to claim 4, wherein the first and second operations are periodically repeated.

6. The method according to claim 1, wherein determining the noise affecting the pilot tone comprises determining a signal to noise ratio value of the pilot tone.

7. The method according to claim 1, wherein determining the noise affecting the pilot tone comprises determining a phase angle dispersion.

8. The method according to claim 1, wherein multi-carrier communications system comprises an Asymmetric Digital Subscriber Line (ADSL) system, wherein data is modulated on sets of carriers and the data comprises Discrete Multi Tone (DMT) symbols.

9. A pilot carrier allocation device which determines, in a multi-carrier communication system comprising a plurality of carriers wherein a at least carrier has a pilot tone function, a time misalignment between a transmitter clock and a receiver clock based on an average of phase errors of at least two pilot tones, wherein a phase error of a pilot tone is weighted by a pilot tone weight based on noise affecting the pilot tone, the device comprising a noise determining unit for determining noise affecting the pilot tone; and performing at least one of reallocating the pilot tone function from the at least one carrier to another carrier of the plurality of carriers and reducing the weight of the pilot tone if the noise affecting the pilot tone is greater than or equal to a predetermined level.

10. The pilot carrier allocation device according to claim 9, wherein the at least one of the pilot tone function reallocation and the weight reduction is performed if an average of the pilot tones phase errors before the at least one of the pilot tone function reallocation and the weight reduction is substantially equal to an average of the pilot tones phase errors after the at least one of the pilot tone function reallocation and the weight reduction.

11. The pilot carrier allocation device according to claim 10, further comprising an equalization circuit which equalizes the pilot tones before performing the at least one of the pilot tone function reallocation and the weight reduction.

12. The pilot carrier allocation device according to claim 11, wherein
   in a first operation active pilot tones are used to synchronize the multi-carrier communication system, and
   in a second operation inactive pilot tones are used to synchronize the multi-carrier communication system, while the active pilot tones are inactivated and equalized.

13. The pilot carrier allocation device according to claim 12, wherein the first and second operations are periodically repeated.

14. The pilot carrier allocation device according to claim 9, wherein determining the noise affecting the pilot tone comprises determining a signal to noise ratio value of the pilot tone.

15. The pilot carrier allocation device according to claim 9, wherein determining the noise affecting the pilot tone comprises determining a phase angle dispersion.

16. The pilot carrier allocation device according to claim 9, wherein the multi-carrier communications system comprises an Asymmetric Digital Subscriber Line (ADSL) system, wherein data is modulated on sets of carriers and wherein the data comprises Discrete Multi Tone (DMT) symbols.

* * * * *